United States Patent [19]
Denninger

[11] Patent Number: 5,502,446
[45] Date of Patent: Mar. 26, 1996

[54] GPS-BASED AUTOMATIC TARGET REPORTING AND FINDING NETWORK AND COMPONENTS

[75] Inventor: Valentine L. Denninger, Sunnyvale, Calif.

[73] Assignee: Trimble Navigation Limited, Sunnyvale, Calif.

[21] Appl. No.: 236,638

[22] Filed: May 2, 1994

[51] Int. Cl.[6] ........................................ G01S 5/02
[52] U.S. Cl. ........................ 342/357; 342/352; 455/12.1
[58] Field of Search .................... 342/357, 352; 455/12.1

[56] References Cited

U.S. PATENT DOCUMENTS

| | | | |
|---|---|---|---|
| 5,119,102 | 6/1992 | Barnard | 342/357 |
| 5,361,212 | 11/1994 | Class et al. | 364/428 |
| 5,367,306 | 11/1994 | Hollon et al. | 342/386 |
| 5,379,045 | 1/1995 | Gilbert et al. | 342/357 |
| 5,414,432 | 5/1995 | Penny, Jr. et al. | 342/357 |

Primary Examiner—Thomas H. Tarcza
Assistant Examiner—Dao L. Phan
Attorney, Agent, or Firm—Law Offices of Thomas E. Schatzel

[57] ABSTRACT

A GPS emergency rescue network comprising at least one GPS receiver and L2-frequency transmitter combination for a target, and a GPS receiver able to tune the L2 frequency transmissions of the target's transceiver. A constellation of orbiting GPS satellites transmit their range information on two carrier frequencies, L1 and L2, and are differentiated from the survivor's L2-frequency transmissions by unique pseudo-random number codes in the spread spectrum code multiple access scheme that is otherwise conventional.

3 Claims, 4 Drawing Sheets

GPS-BASED AUTOMATIC TARGET REPORTING AND FINDING NETWORK AND COMPONENTS

BACKGROUND OF THE INVENTION

1. Field of the Invention

The invention relates generally to navigation equipment and more specifically to global positioning system receivers which report their self-positioning to other monitors and rescue networks that include such receivers.

2. Description of the Prior Art

A satellite positioning system (SPS) is a system of orbiting satellite signal transmitters, with receivers located on or near the earth's surface, that transmits information from which an observer's location and/or the time of observation can be determined. Two such operational systems are the global positioning system and the global orbiting navigational system.

The global positioning system (GPS) is part of a satellite-based navigation system developed by the United States Defense Department under its NAVISTAR satellite program. A fully operational GPS includes up to twenty-four satellites approximately uniformly dispersed around six circular orbits with four satellites in each orbit. The orbits are inclined at an angle of 55° relative to the equator, and are separated from each other by multiples of 60° longitude. The orbits have radii of 26,560 kilometers and are approximately circular. The orbits are non-geo-synchronous, with 0.5 sidereal day (11.967 hours) orbital time intervals, so that the satellites move with time relative to the earth below.

Theoretically, three or more GPS satellites will be visible from most points on the earth's surface, and visual access to three or more such satellites can be used to determine an observer's position anywhere on the earth's surface, twenty-four hours per day. Each satellite carries a cesium and rubidium atomic clock to provide timing information for the signals transmitted by the satellites. Internal clock correction is provided for each satellite clock.

Four satellites, at a minimum, are needed to uniquely determine x, y, z earth-position and time. If only three satellites are visible, conventional GPS software solves for x, y and time. Time is nearly always needed to be ascertained, and the z-dimension can be constrained, e.g., assumed.

Each GPS satellite transmits two spread spectrum, L-band carrier signals. An "L1" signal has a frequency $f1=1575.42$ MHz, and an "L2" signal has a frequency $f2=1227.6$ MHz. These two frequencies are integral multiples $f1=(1500)(f0)$ and $f2=(1200)(f0)$ of a base frequency $f0=1.023$ MHz. The L1 signal from each satellite is binary phase shift key (BPSK) modulated by two pseudo-random noise (PRN) codes in phase quadrature, and carries a coarse grained acquisition code (C/A-code) and/or a precision, fine-grained code (P-code). The L2 signal from each satellite is BPSK modulated by only the P-code.

The use of two carrier signals L1 and L2 permits the computation for partial compensation of the propagation delays of the signals through the ionosphere. This ionospheric delay varies approximately as the inverse square of signal frequency f (delay $\alpha f^{-2}$). This phenomenon is discussed by MacDoran in U.S. Pat. No. 4,463,357.

Use of the PRN codes in a code multiple access scheme allows the sorting out of the GPS satellite signals which all share the same L1 and L2 frequencies. A signal transmitted by a particular GPS satellite is selected by generating and matching, or correlating, the corresponding, unique PRN code for that particular satellite. The PRN codes come from a short list, and each is stored in GPS receivers carried by ground observers.

The P-code, is a relatively long, fine-grained code having an associated clock or chip rate of $(10)(f0)=10.23$ MHz. The C/A-code allows rapid satellite signal acquisition and hand-over to the P-code and is a relatively short, coarser grained code having a clock or chip rate of $f0=1.023$ MHz. The C/A-code for any GPS satellite has a length of 1023 chips and thus repeats every millisecond. The full P-code has a length of 259 days, with each satellite transmitting a unique portion of the full P-code. The portion of P-code used for a given GPS satellite has a length of precisely one week (7.000 days) before this code portion repeats. Acceptable methods for generating the C/A-code and P-code are set forth in the document GPS interface control document ICD-GPS-200, published by Rockwell International Corporation, satellite systems division, Revision A, 26 Sep. 1984.

The GPS system is such that the C/A-code and P-code can be deliberately corrupted by random dithering, which inhibits position-fix accuracy. This mode is called selective availability (SA), and includes the transmission of an encrypted Y-code on frequency L2. "Authorized" receivers are required to decode the Y-code and such receivers will retain their accuracy in position fix determination during SA.

The GPS satellite bit stream includes navigational information on the ephemeris of the transmitting GPS satellite and an almanac for all GPS satellites, with additional parameters providing corrections for ionospheric signal propagation delays suitable for single frequency receivers and for an offset time between satellite clock time and true GPS time. The navigational information is transmitted at a rate of fifty Baud. A useful discussion of the GPS and techniques for obtaining position information from the satellite signals is found in *Guide To GPS Positioning*, edited by David Wells, Canadian GPS Associates, 1986.

A second configuration for global positioning is the global orbiting Navigation satellite system (GLONASS), placed in orbit by the former Soviet Union and now maintained by the Russian Republic. GLONASS also uses twenty-four satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete seventeen and sixteen revolutions, respectively, around the earth every eight days. The GLONASS system uses two carrier signals "L1" and "L2" with frequencies of $f1=(1.602+9 k/16)$ GHz and $f2=(1.246+7 k/16)$ GHz, where $k(=0,1,2,\ldots,23)$ is the channel or satellite number. These frequencies lie in two bands at 1.597–1.617GHz (L1) and 1.240–1.260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at rate of fifty Baud. Because the channel frequencies are distinguishable from each other, the P-code is the same, and the C/A-code code is the same, for each satellite. The methods for receiving and analyzing the GLONASS signals are similar to the methods used for the GPS signals.

Single frequency (L1 only) and dual-frequency (L1 and L2) GPS receivers are now commercially available that are unauthorized and therefore unable to decode the encrypted Y-code. Dual frequency GPS receivers are capable of receiving more than just the L2 carrier transmissions from GPS satellites. A single frequency GPS receiver system could be associated with L2 transmitters that would cause little, if any, interference on the L1 frequency. Since much or all of the hardware already exists in portable GPS receivers to receive position reports over an otherwise under-used L2 carrier frequency, only software changes to the programming of a conventional GPS receiver may be needed to implement a ground network that has its members' individual positions communicated amongst them.

Conventional GPS receivers can provide downed pilots, for example, with their location, but it may not always be possible for that information to be relayed by the pilot verbally. Ad hoc position reporting can also be difficult, so an automatic means is desirable that has a minimal impact on the kind of hardware required to mount a rescue operation, or to coordinate dispatching mobile units in the field.

SUMMARY OF THE PRESENT INVENTION

It is therefore an object of the present invention to provide a GPS-based emergency rescue network in which individual GPS receivers belonging to the survivors communicate their respective positions to rescuer units in the network.

It is another object of the present invention to provide a GPS receiver that reports its position automatically via a radio link to other GPS receivers.

Briefly, a GPS receiver embodiment of the present invention comprises a GPS receiver with a data input/output port that communicates position fixes to a radio transmitter tuned to the "L2" GPS carrier channel. The radio transmitter includes a timer and a code modulator to periodically transmit the position fixes with a user identification code in a burst over a data channel. In a network environment, the navigational position fixes of each member of the network are available for display by each GPS receiver.

An advantage of the present invention is that a GPS receiver is provided that communicates its position out over a data channel for use by other stations.

Another advantage of the present invention is that a GPS network is provided in which individual mobile units automatically and periodically have their positions determined and reported into a central location.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
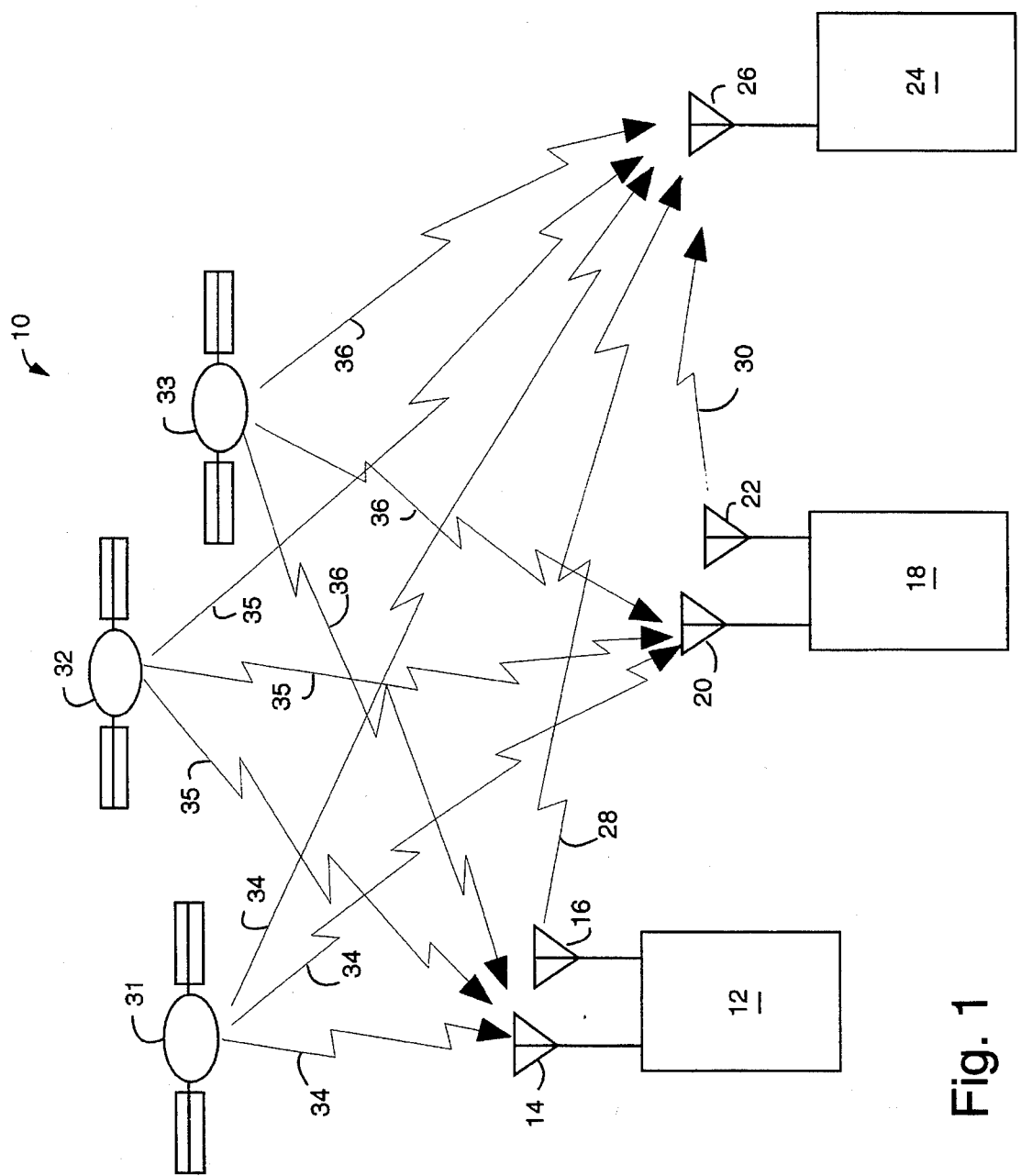
FIG. 1 is a block diagram of a GPS emergency rescue network embodiment of the present invention.

FIG. 1 illustrates an emergency global positioning system (GPS) network embodiment of the present invention, referred to herein by the general reference numeral 10. Such a network is useful for the coordination of rescuers in the saving of lost targets and/or survivors equipped with components of the network 10. For example, lost targets can include sailboats in distress in the open ocean, downed aircraft pilots, other military personnel and dispatched emergency vehicles. Network 10 comprises a first GPS receiver and radio transmitter combination (XCVR) 12 equipped with a GPS patch antenna 14 and a microwave transmitter antenna 16, a second GPS receiver and radio transmitter combination (XCVR) 18 equipped with a GPS patch antenna 20 and a microwave transmitter antenna 22 and a GPS receiver 24 with a GPS patch antenna 26. The XCVRs 12 and 18 are representative of any number of land, air or sea mobile units. Such mobile units may comprise police cars on a day watch, fire fighting units deployed in combating a forest fire, infantrymen in a company of soldiers, a squad of naval destroyers, or pilots engaged in sorties that can be rescued, if need be, later if they were to bail out from a plane. The GPS receiver 24 is shown as a single unit, but the invention is not so limited. Any number of such units may be included within network 10 to provide individual direction vectors to respective ones of the XCVRs 12 and 18.

The XCVR 12 broadcasts its own position determinations from antenna 16 to GPS receiver 24 via a signal 28. Similarly, The XCVR 18 broadcasts its own position determinations from antenna 22 to GPS receiver 24 via a signal 30. The XCVRs 12 and 18 and GPS receiver 24 receive GPS signals, e.g., from a set of at least three visible satellites 31–33. A signal 34 provides range information from GPS satellite 31 to XCVRs 12 and 18 and GPS receiver 24. A signal 35 provides range information from GPS satellite 32 to XCVRs 12 and 18 and GPS receiver 24. A signal 36 provides range information from GPS satellite 33 to XCVRs 12 and 18 and GPS receiver 24. These ranges are called "pseudo-ranges" because of small clock errors which are present in each receiver which exist until the best overall estimate of system time "t" is made as part of the overall navigation solution. Pseudo-ranges become exact ranges to within the overall system accuracy limits when the four equations involving the four unknown variables (latitude, longitude, altitude and time) are simultaneously solved. Once the range information and satellite ephemeris are known, the triangulation equations are solved, yielding the position.

GPS satellites 31–33 transmit two modulated radio carriers, e.g., "L1" at 1575.42 MHz and "L2" at 1227.6 MHz, via complex signals 34–36. The information transmitted from satellites 31–33 is code modulated with spread-spectrum techniques using pseudo-random number (PRN) codes unique to each satellite.

The XCVRs 12 and 18 transmit on one of the two previously-mentioned modulated radio carriers, e.g., "L2" at 1227.6 MHz, via signals 28 and 30. The information transmitted from XCVRs 12 and 18 is similarly code modulated with spread-spectrum techniques using pseudo-random number (PRN) codes unique to each XCVR 12 and 18. The GPS receiver 24 is then able to simultaneously receive and differentiate signals sharing frequency L2 as coming from one of the GPS satellites 31–33 and XCVRs 12 and 18. However, the GPS receiver 24 must be specially adapted, e.g., in its software programming, to recognize the non-conventional PRN codes transmitted by the XCVRs 12 and 18.

The XCVRs 12 and 18 determine their respective earth positions using signals 34–36 received at their corresponding locations and use conventional GPS receiver technology. For example, XCVRs 12 and 18 may each comprise a commercially available GPS receiver, such as the SCOUT™, as marketed by Trimble Navigation (Sunnyvale, Calif). The position determinations are then used to modulate the signals 28 and 30, as transmitted by a conventional microwave radio transmitter. As such, distance-to-goal, estimated-time-of-arrival and velocity-made-good estimates can be made available with respect to each of XCVRs 12 and 18 on a target track screen included in GPS receiver 24. In conventional instruments, the automatically received position determinations of XCVRs 12 and 18 would appear to be destination coordinates that a user had manually entered.

Absolute positions and velocities for the XCVRs 12 and 18 may either be updated by polling them automatically from a command base station, for example that includes GPS receiver 24, or by continuously monitoring any mobile GPS receivers (one to five seconds) for eventual use in display from a map database, e.g., in topographic or metropolitan street formats. To archive such data, the absolute positions with time tags can be stored in a database. An emergency button may also be provided on each of the XCVRs 12 and 18 to allow a user to signal an emergency. Such a pushbutton may be water-activated, as in the case of an emergency beacon used by boaters, similar to the "EPIRB" service.

Figure 2:
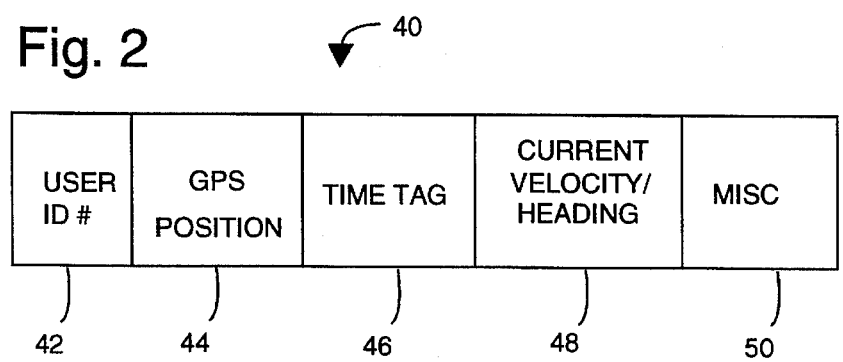
FIG. 2 is a diagram representing a data communication format used between the transceivers and the GPS receiver of FIG. 1.

An exemplary message frame 40 which is communicated by signals 28 and 30 is illustrated in FIG. 2, and comprises 400 bits of data that are divided into several fields. Such a frame can be sent as the fifty baud navigation channel, normally included in the GPS "L2" carrier information. Message frames 40 are generated by XCVRs 12 and 18 and received by GPS receiver 24. A user ID field 42 uniquely identifies XCVRs 12 and 18 alphanumerically to GPS receiver 24 when within radio range. A GPS position field 44 communicates the navigation position fix information that has been determined by the XCVR 12 or 18 which is identified in field 42. A time tag field 46 permits the information in field 44 to be dated and thus coordinated. A field 48 communicates the current velocity and heading of the network 10 identified in field 42. Miscellaneous information, such as search and rescue team identification codes or authorizations may be communicated in a field 50.

Various conventional error-free protocols could be used in the system-to-system communication of message frames 40.

Incoming message packets from the XCVRs 12 and 18 are used to supply individual network member absolute positions and velocities, and this information is stored by user identification number as goal or waypoint equivalents. Recalling such information permits heading (HDG), distance-to-goal (DTG), estimated-time-of-arrival (ETA) and velocity-made-good (VMG) estimates to be presented for guiding a rescuer to a survivor equipped with XCVR 12 or 18.

The use of waypoints and goals in GPS systems is conventional, as are the methods and computer system techniques used to compute distance-to-goal (DTG), heading (HDG), estimated-time-of-arrival (ETA) and velocity-made-good (VMG) estimates from a current GPS-determined absolute position and velocity to a waypoint or goal (GOAL). Therefore, a detailed disclosure of such is unnecessary here. The present invention provides for the automatic input of network member absolute position, velocity and heading information and substitutes the traditional waypoint and goal positions with these data. As a consequence, the waypoints and goals representing other users in network 10 are dynamic and in need of periodic updating.

Figure 3:
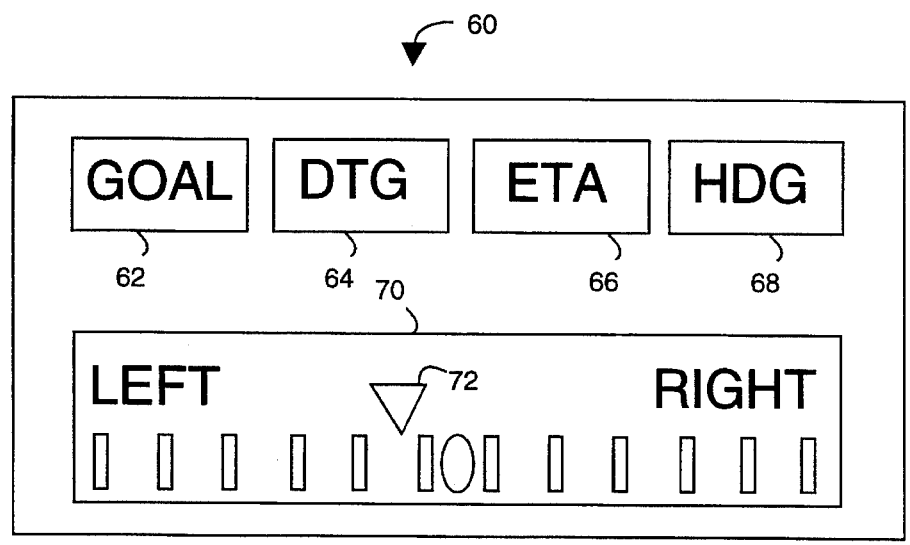
FIG. 3 is a diagram of screen display used by the GPS receiver of FIG. 1.

FIG. 3 illustrates a target track screen 60 that may be represented on a conventional GPS receiver display. The screen 60 is divided into sections. A section 62 is used to display a goal identification code, such as a user identification (ID). A section 64 is used to display an estimated distance to goal (DTG) or a waypoint that has been selected by manipulating the keyboard 68. Such a waypoint may, in fact, be the position of XCVR 12 or 18, as communicated by radio signals 28 or 30. A section 66 is used to display an estimated time of arrival (ETA) of the user to the selected waypoint, given the velocity and heading of both the units involved. A section 68 is used to display the heading (HDG) to the goal. A gauge 70 is used to display the relative magnitude of left or right correctional heading change necessary for a user to converge on the selected goal. A cursor 72 moves left or right to indicate the required heading change to converge on the selected goal.

Figure 4:
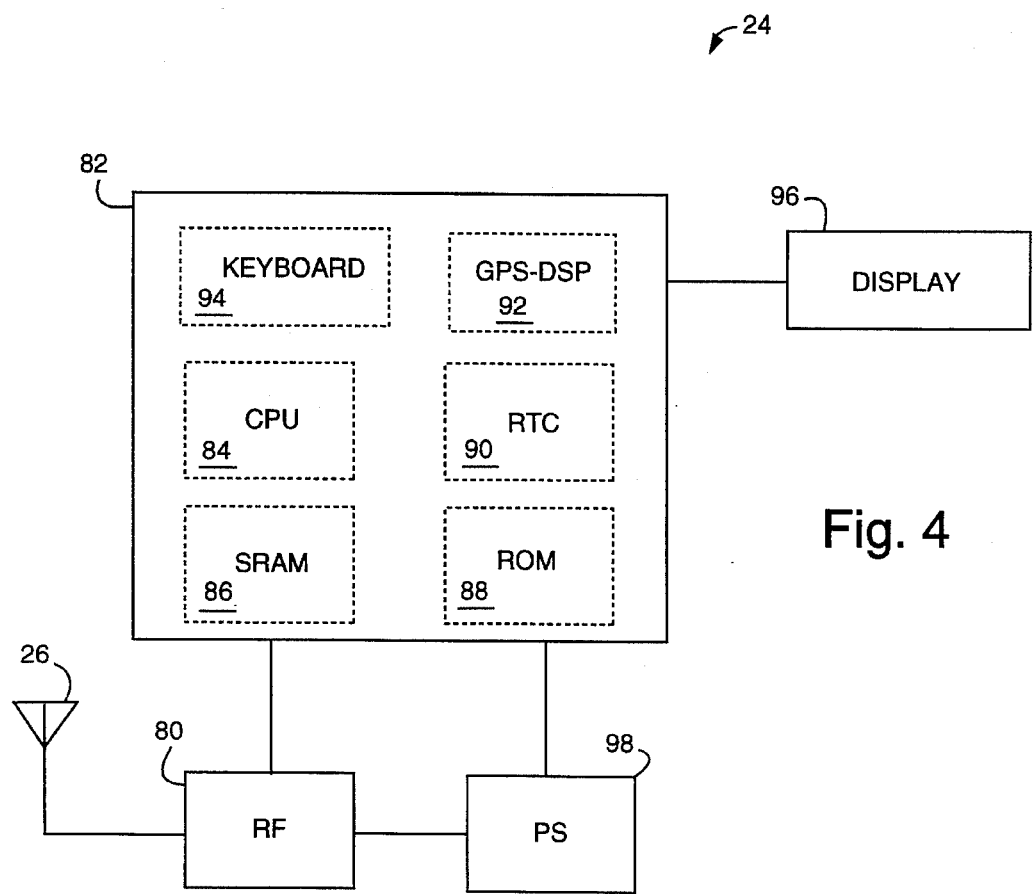
FIG. 4 is a block diagram of the GPS receiver included in FIG. 1.
Figure 5:
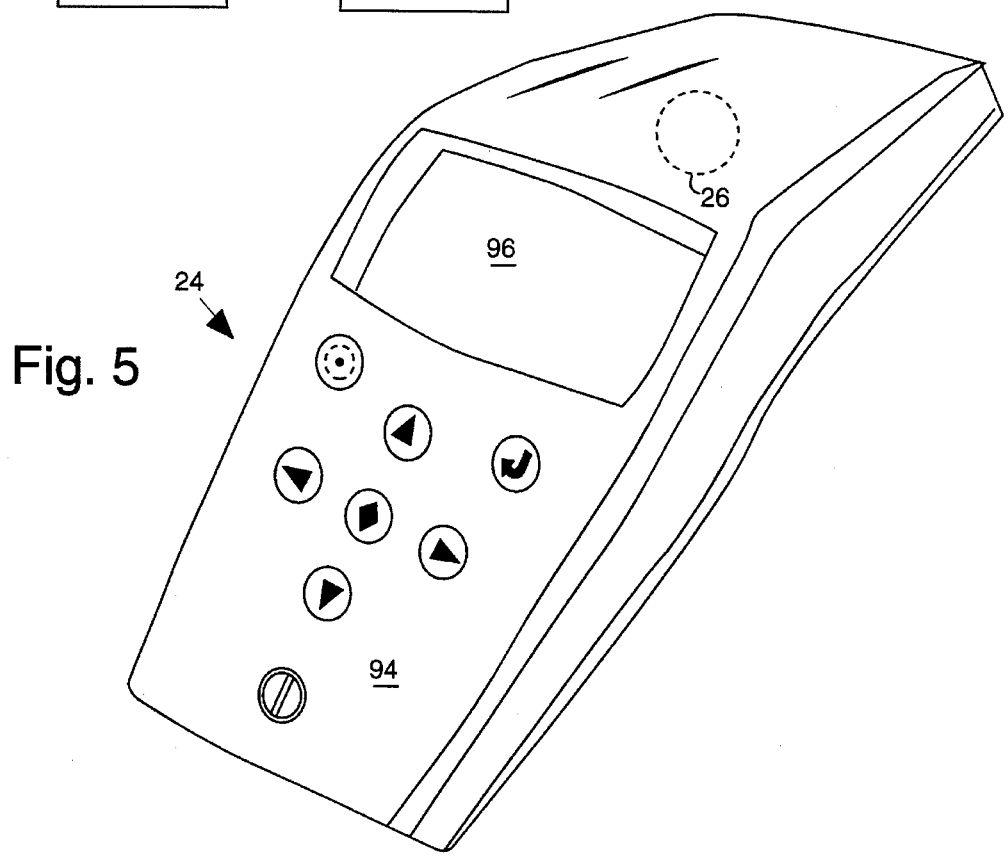
FIG. 5 is perspective diagram of the GPS receiver of FIG. 4.

FIGS. 4 and 5 illustrate the GPS receiver 24, which comprises conventional GPS receiver hardware, but has been specially modified in its programming to recognize the PRN codes sent by the XCVRs 12 and 18. The programming further accepts the information sent by the XCVRs 12 and 18 as being the coordinates of remote points, such as waypoints or goal destinations. GPS receiver 24 comprises the antenna 26 to receive radio signals from the orbiting GPS satellites 31–33, a radio frequency (RF) stage 80 to amplify and downconvert such GPS radio signals and a navigation computer 82.

Navigation computer 82 includes a microprocessor (CPU) 84, a static random access memory (SRAM) 86, a read only memory (ROM) 88, a real time clock (RTC) 90 and a GPS digital signal processor (GPS-DSP) 92. CPU 84 may take many forms, e.g., a Motorola type 68000 microprocessor. SRAM 86 has a capacity of 64K bytes and ROM 88 stores eight megabytes.

ROM 88 has machine code programmed into it that embodies an operating system to communicate with a keyboard 94 and a display 96 for interaction with a user. ROM 88 is typically used to store the modified program to accept data from the XCVRs 12 and 18.

A power supply (PS) 98 powers GPS receiver 24 and may include a battery for portable use and an adapter, e.g., a cigarette lighter adapter for use in an automobile.

The operating system causes RF 80 to tune to selected ones of GPS satellites 31–33 and to direct CPU 84 to demodulate their respective signals to obtain range information. GPS-DSP 92 is controlled, for example, to produce navigation fixes each second in an x,y,z coordinate system that is aligned to the earth at the equator, poles and Greenwich, England (prime meridian). Such computations of X,Y,Z and the hardware to support them are conventional and may be obtained commercially, for example the GPS receiver marketed as SCOUT by Trimble Navigation (Sunnyvale, Calif.) may be used.

Figure 6:
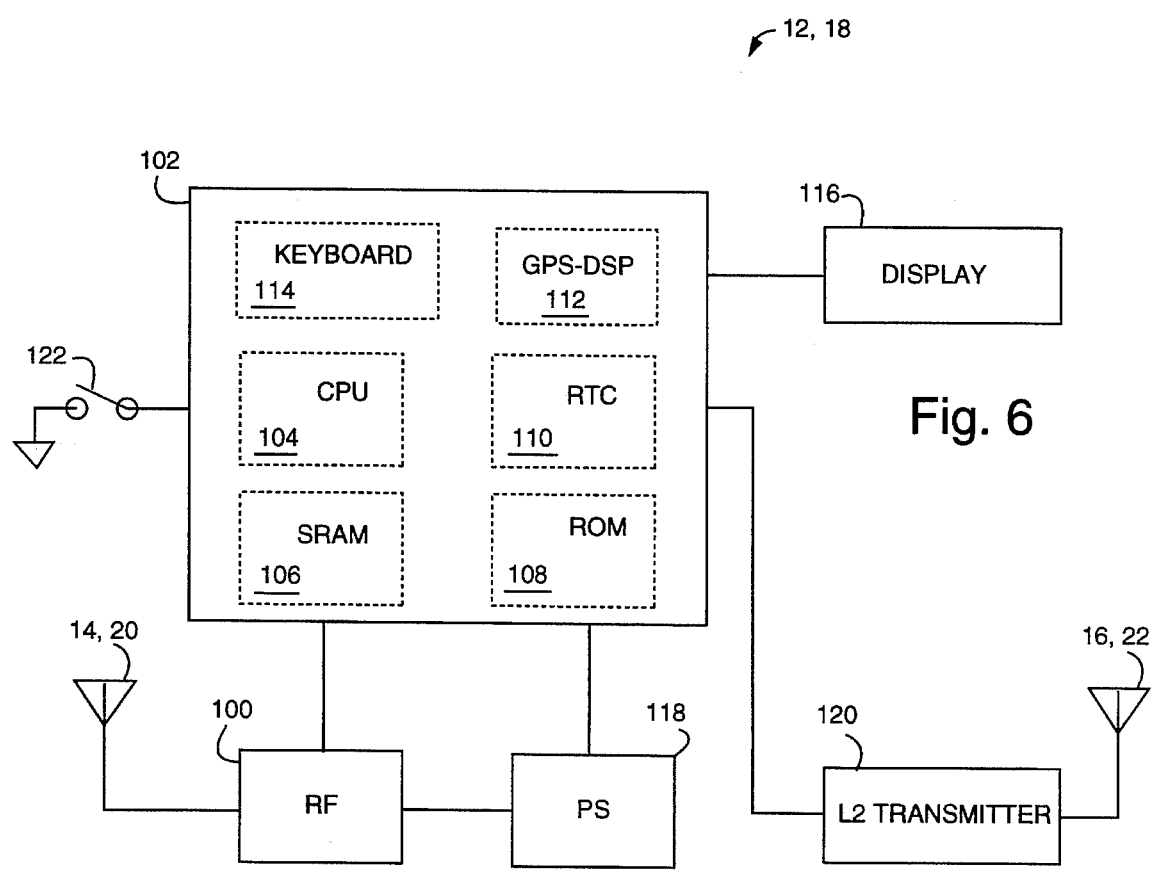
FIG. 6 is a block diagram of the transceivers included in FIG. 1.

FIG. 6 illustrates the XCVRs 12 and 18 and shows their similarity with the GPS receiver 24. The XCVRs 12 and 18 each comprise a radio frequency (RF) amplifier 100 for low-noise amplification of signals 34–36 and a navigation computer 102 which has a microcomputer (CPU) 104, a static random access memory (SRAM) 106, a read only memory (ROM) 108, a real-time clock (RTC) 110, a GPS digital signal processor (GPS-DSP) 112 for computing positions and velocities, and a user keyboard 114. A user display 116 is used in conjunction with the keyboard 114 to communicate with the user, e.g., with the display of FIG. 3. A power supply 120 provides either battery power or line-operated power. An L2-frequency transmitter 120 is controlled by the navigation computer 102 and especially CPU 104 for on-off operation. A switch 122 signals the CPU 104 when it is appropriate for L2-frequency transmitter 120 to output signals 28 or 30. For example, the switch 122 can be water-activated such that when XCVR 12 or 18 is used for boating emergencies as an EPIRB unit, CPU 104 will cause navigation computer 102 to compute its position and to transmit that position via L2 frequency transmitter 120. The switch 122 may also be activated manually, by light, by heat, by pressure or by trip wire, as appropriate in various specialized applications.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An automatic target reporting and finding network (10), comprising:

a constellation of orbiting navigation satellites (31–33) for transmitting from each two spread spectrum, L-band microwave carrier signals "L1" and "L2" (34–36) in a code division multiple access (CDMA) configuration that shares the same L1 and L2 frequencies, wherein said L1 signal from each satellite is binary phase shift key (BPSK) modulated by two pseudo-random noise (PRN) spreading codes in phase quadrature and carries a coarse grained acquisition code (C/A-code) and/or a precision, fine-grained code (P-code), and wherein said L2 signal from each satellite is BPSK modulated by only said P-code and provides for a fifty baud navigation channel;

a first mobile unit (12) including a radio frequency (RF) amplifier (100) for low-noise amplification of L1 signals (34–36), a navigation computer (102) including a microcomputer (CPU) (104) and a digital signal processor (DSP) (112), all interconnected to compute a first set of positions and velocities of the first mobile unit (12) from ranging and timing information included in said L1 signals (34–36);

a first L2-frequency transmitter (120) connected to receive said first set of positions and velocities of the first mobile unit (12) and to transmit such data by CDMA access on said L2 carrier frequency (28) with a first PRN spreading code different from any used by said satellites (31–33);

a second mobile unit (24) including a radio frequency (RF) amplifier (80) for low-noise amplification of L1 and L2 signals (28 and 34–36), a navigation computer (82) including a microcomputer (CPU) (84) and a digital signal processor (DSP) (92) all interconnected to compute a second set of positions and velocities of the second mobile unit (24) from ranging and timing information included in said L1 signals (34–36); and vector means (40, 60, 88, 94, 96) connected to receive said first set of positions and velocities of the first mobile unit (12) communicated by said L2 carrier frequency (28) to said RF amplifier (80), and connected to receive said second set of positions and velocities of the second mobile unit (24), and providing for an indication of said first position relative to said second position.

2. The network of claim 1, further comprising:

a third mobile unit (18) including a radio frequency (RF) amplifier (100) for low-noise amplification of L1 signals (34–36), a navigation computer (102) including a microcomputer (CPU) (104) and a digital signal processor (DSP) (112), all interconnected to compute a third set of positions and velocities of the third mobile unit (18) from ranging and timing information included in said L1 signals (34–36); and a second L2-frequency transmitter (120) connected to receive said third set of positions and velocities of tile third mobile unit (12) and to transmit such data by CDMA access on said L2 carrier frequency (30) with a second PRN spreading code different from any used by said satellites (31–33) and different from said first CDMA spreading code;

wherein said radio frequency (RF) amplifier (80) further provides for reception of L2 signals (28, 30 and 34–36) and the vector means (88, 94, 96) is further connected to receive said third set of positions and velocities of the third mobile unit (12) communicated by said L2 carrier frequency (30) to said RF amplifier (80), and provides for an indication of said third position relative to said second position.

3. The network of claim 2, wherein:

said L2 frequency signals (28 and 30) comprise data messages divided into a plurality of fields (42, 44, 46, 48, 50) in a data frame (40) sent to mimic said fifty baud navigation channel and including user an ID field (42) for uniquely identifying the first and second L2-frequency transmitters (120), a navigation position field (44) for communicating navigation position fix information including said first and third positions, a time tag field (46) dating said information in said navigation position field (44), and a velocity/heading field (48) for communicating said first and third velocities to the second mobile unit.

* * * * *